United States Patent
Sugiyama et al.

(10) Patent No.: US 10,170,028 B2
(45) Date of Patent: *Jan. 1, 2019

(54) DATA TRANSMISSION SYSTEM INCLUDING ENCODER AND A CLOCK RECOVERY SYSTEM FOR DISPLAY DEVICE, DATA TRANSMISSION METHOD FOR DISPLAY DEVICE AND DISPLAY DEVICE

(71) Applicant: Renesas Electronics Corporation, Tokyo (JP)

(72) Inventors: Akio Sugiyama, Tokyo (JP); Takashi Nose, Tokyo (JP); Yoshihiko Hori, Tokyo (JP); Hirobumi Furihata, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/595,641

(22) Filed: May 15, 2017

(65) Prior Publication Data
US 2017/0250843 A1 Aug. 31, 2017

Related U.S. Application Data

(63) Continuation of application No. 14/726,904, filed on Jun. 1, 2015, now Pat. No. 9,747,830, which is a
(Continued)

(30) Foreign Application Priority Data

Mar. 29, 2011 (JP) .................. 2011-073122

(51) Int. Cl.
*G09G 5/00* (2006.01)
*G09G 3/20* (2006.01)
(Continued)

(52) U.S. Cl.
CPC .......... *G09G 3/2018* (2013.01); *G06F 13/00* (2013.01); *G09G 5/008* (2013.01); *G09G 5/18* (2013.01);
(Continued)

(58) Field of Classification Search
CPC ......... H03M 5/145; H03M 7/46; G06T 9/005; G09G 2360/127; G11B 20/1426; G11B 2020/1457
See application file for complete search history.

(56) References Cited

U.S. PATENT DOCUMENTS

| | | | |
|---|---|---|---|
| 5,264,952 | A | 11/1993 | Fukutani et al. |
| 5,497,256 | A | 3/1996 | Aoyama et al. |

(Continued)

FOREIGN PATENT DOCUMENTS

| | | | |
|---|---|---|---|
| JP | S59-200561 A | 11/1984 | |
| JP | H1-109826 A | 4/1989 | |

(Continued)

OTHER PUBLICATIONS

Notice of Allowance dated Feb. 5, 2015 in U.S. Appl. No. 13/431,859.
(Continued)

*Primary Examiner* — Hang Lin
(74) *Attorney, Agent, or Firm* — McGinn I.P. Law Group, PLLC.

(57) ABSTRACT

A data transmission system for a display device, the data transmission system comprising: an encoder having at least one translation table, encoding m bits of a data into n bits of a data on the basis of the translation table; a parallel-to-serial converter; a clock recovery circuit for recovering a clock from the data encoded and serialized; a serial-to-parallel converter for decoding the n bits of the encoded data to the m bits of the data; and an output driver for outputting a gray scale voltage, wherein an amplitude of the gray scale voltage
(Continued)

is determined according to a value of the m bit of the data, and, wherein in the translation table, a larger the amplitude of the gray scale voltage of a bit pattern in 2 m pieces of bit patterns of the m bits of the data, a larger the data change index of the bit pattern.

6 Claims, 12 Drawing Sheets

Related U.S. Application Data continuation of application No. 13/431,859, filed on Mar. 27, 2012, now Pat. No. 9,049,092.

(51) Int. Cl.
*H04L 25/49* (2006.01)
*H04N 7/01* (2006.01)
*G06F 13/00* (2006.01)
*G09G 5/18* (2006.01)

(52) U.S. Cl.
CPC .......... *H04L 25/49* (2013.01); *H04L 25/4908* (2013.01); *H04N 7/01* (2013.01); *G09G 3/2096* (2013.01); *G09G 2310/027* (2013.01); *G09G 2310/08* (2013.01); *G09G 2320/064* (2013.01); *G09G 2330/06* (2013.01); *G09G 2360/127* (2013.01); *G09G 2360/16* (2013.01); *G09G 2370/00* (2013.01)

(56) References Cited

U.S. PATENT DOCUMENTS

| | | | |
|---|---|---|---|
| 5,606,317 A * | 2/1997 | Cloonan | H04L 25/4908 341/58 |
| 6,259,500 B1 | 7/2001 | Kiiirna et al. | |
| 6,496,241 B1 | 12/2002 | Tillin | |
| 8,077,189 B2 | 12/2011 | Ishida | |
| 2001/0002828 A1 | 6/2001 | Kazuhiro | |
| 2001/0056514 A1 | 12/2001 | Ishida et al. | |
| 2003/0218664 A1 | 11/2003 | Sakamoto et al. | |
| 2005/0046771 A1* | 3/2005 | Lee | G02F 1/133784 349/126 |
| 2006/0221278 A1 | 10/2006 | Wu et al. | |
| 2008/0074376 A1* | 3/2008 | Kim | G09G 3/3648 345/94 |
| 2008/0170189 A1 | 7/2008 | Naka et al. | |
| 2008/0218657 A1 | 9/2008 | Hwang et al. | |
| 2011/0069965 A1 | 3/2011 | Kim et al. | |
| 2012/0324320 A1 | 12/2012 | Terabe et al. | |
| 2013/0195468 A1 | 8/2013 | Kim et al. | |

FOREIGN PATENT DOCUMENTS

| | | |
|---|---|---|
| JP | 2001-069181 A | 3/2001 |
| KR | 10-0809948 B1 | 3/2008 |

OTHER PUBLICATIONS

United States Office Action dated Oct. 15, 2014 in U.S. Appl. No. 13/431,859.
Taiwanese Office Action dated Apr. 14, 2016 with an English translation thereof.
Chinese Office Action dated Sep. 14, 2015 with an English translation thereof.
Korean Office Action dated Jul. 2, 2018 in Korean Patent Application No. 10-2012-0031634 with an English translation thereof.
Taiwanese Office Action, dated Mar. 19, 2018 and English Translation thereof.

* cited by examiner

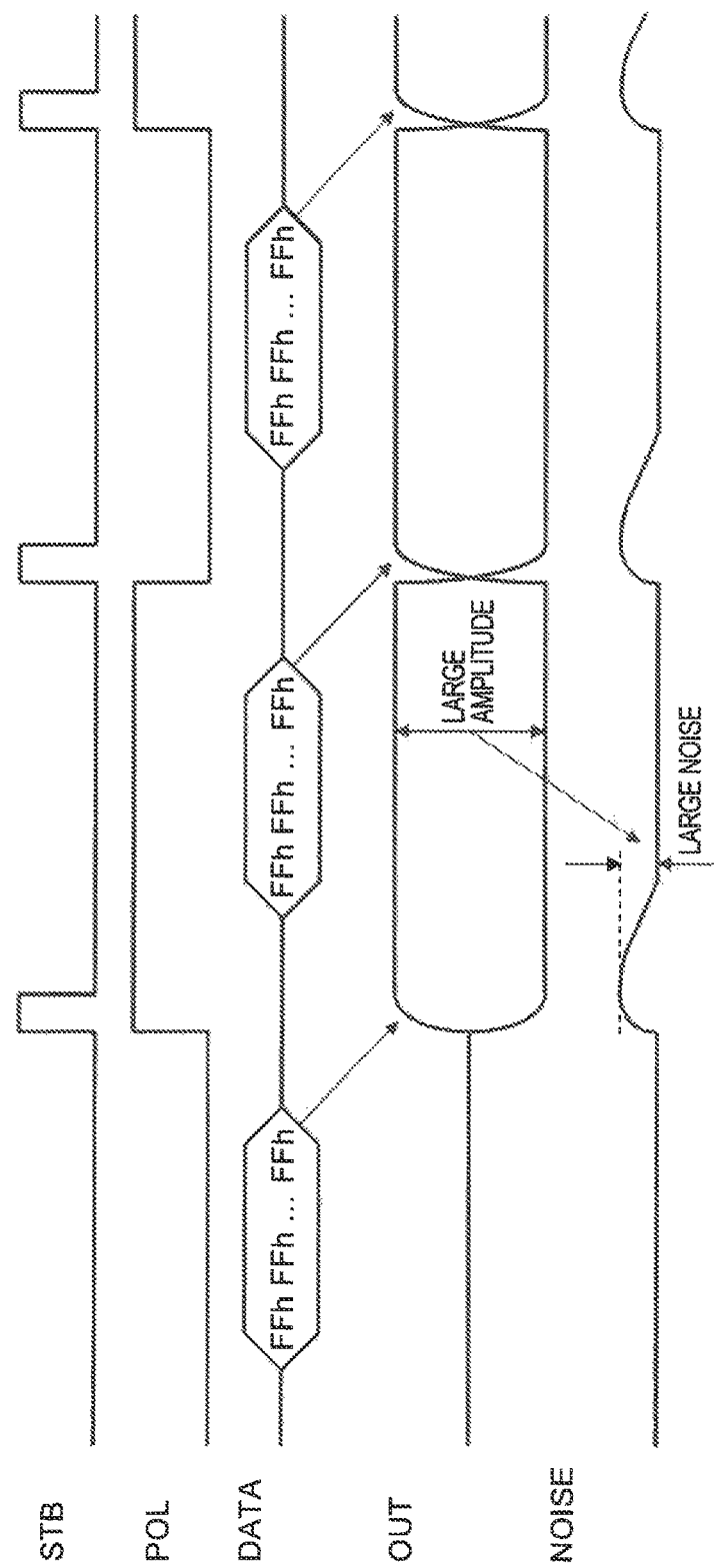

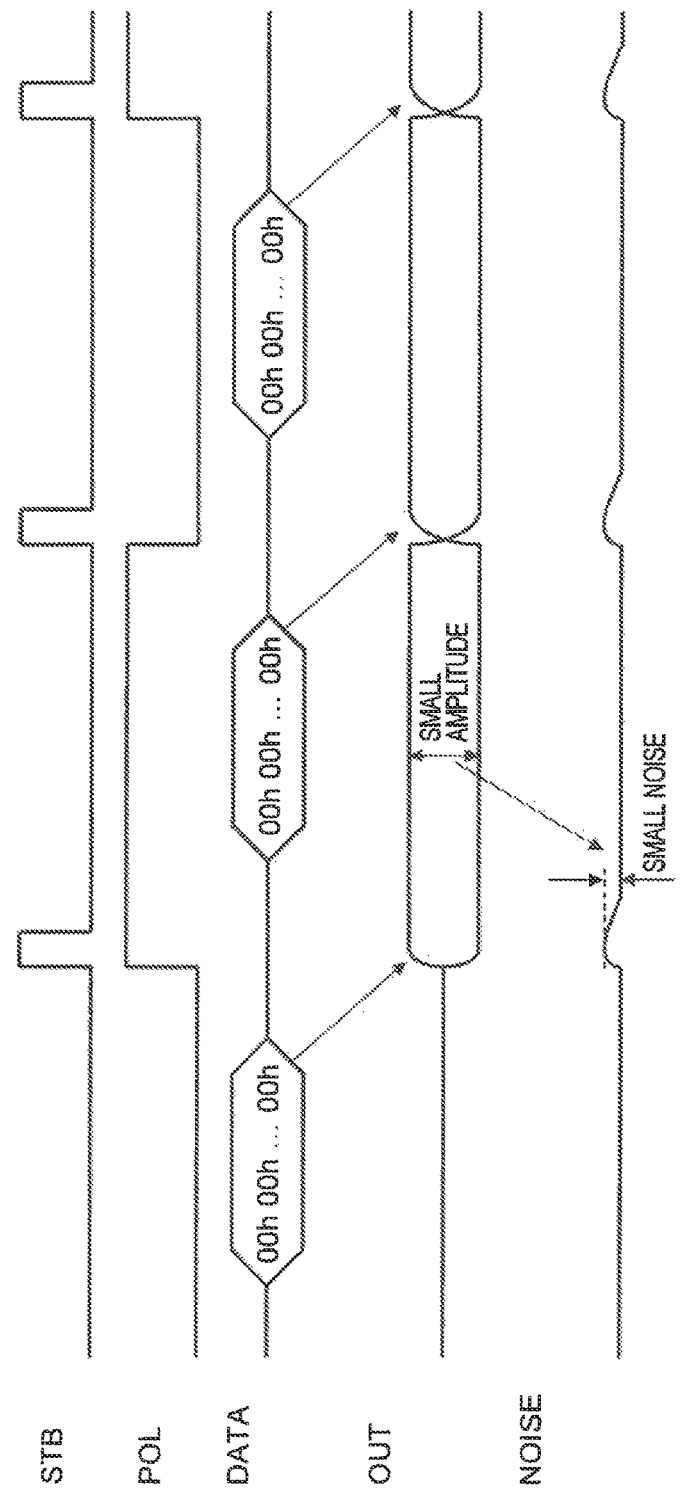

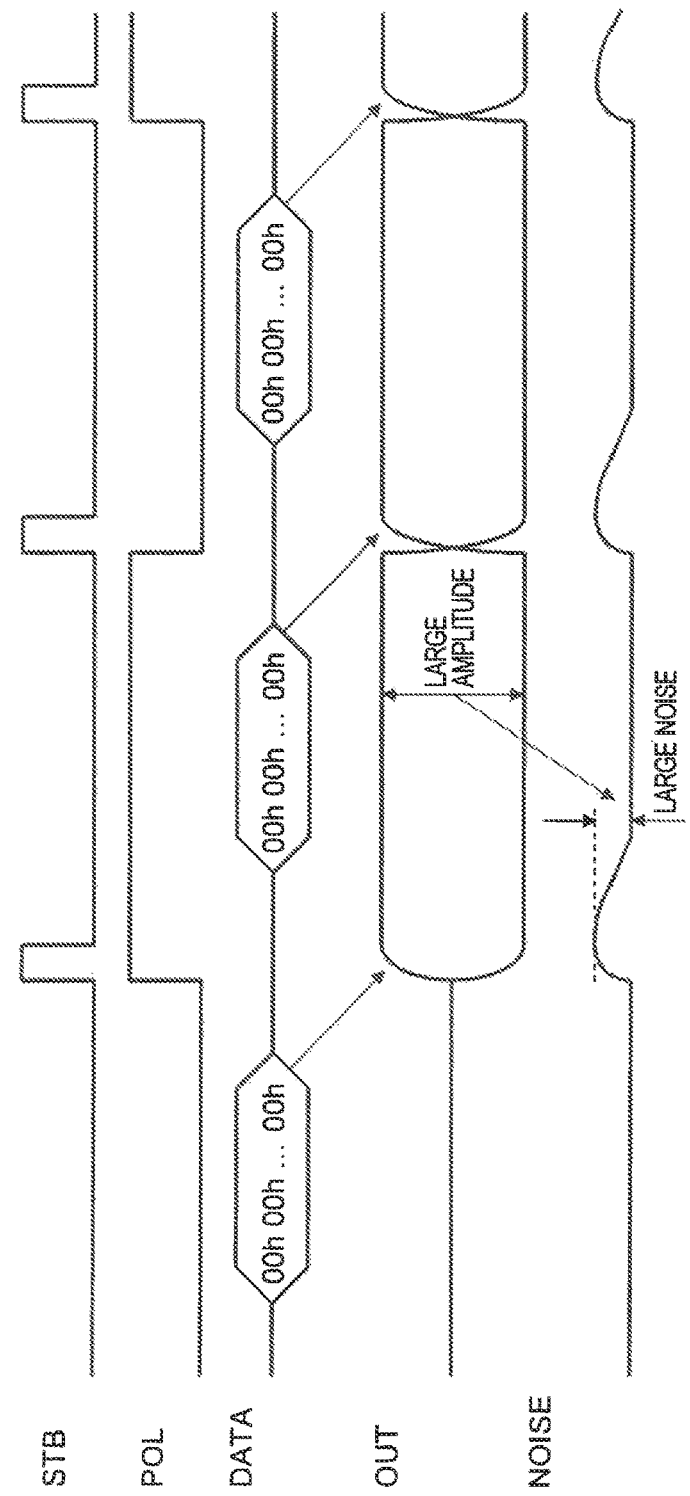

FIG. 5B

4B5B DECODE TABLE

| 5B | 4B | Hex |
|---|---|---|
| 00111 | 0000 | 0 |
| 01110 | 0001 | 1 |
| 10111 | 0010 | 2 |
| 11011 | 0011 | 3 |
| 10011 | 0100 | 4 |
| 11001 | 0101 | 5 |
| 00101 | 0110 | 6 |
| 01011 | 0111 | 7 |
| 10100 | 1000 | 8 |
| 11010 | 1001 | 9 |
| 01001 | 1010 | A |
| 01101 | 1011 | B |
| 10010 | 1100 | C |
| 10110 | 1101 | D |
| 01010 | 1110 | E |
| 10101 | 1111 | F |

4B5B DEC

FIG. 5A

4B5B ENCODE TABLE

| Hex | 4B | 5B |
|---|---|---|
| 0 | 0000 | 00111 |
| 1 | 0001 | 01110 |
| 2 | 0010 | 10111 |
| 3 | 0011 | 11011 |
| 4 | 0100 | 10011 |
| 5 | 0101 | 11001 |
| 6 | 0110 | 00101 |
| 7 | 0111 | 01011 |
| 8 | 1000 | 10100 |
| 9 | 1001 | 11010 |
| A | 1010 | 01001 |
| B | 1011 | 01101 |
| C | 1100 | 10010 |
| D | 1101 | 10110 |
| E | 1110 | 01010 |
| F | 1111 | 10101 |

4B5B ENC

FIG. 7A

4B5B ENCODE TABLE

| Hex | 4B | 5B |
|---|---|---|
| 0 | 0000 | 11110 |
| 1 | 0001 | 01001 |
| 2 | 0010 | 10100 |
| 3 | 0011 | 10101 |
| 4 | 0100 | 01010 |
| 5 | 0101 | 01011 |
| 6 | 0110 | 01110 |
| 7 | 0111 | 01111 |
| 8 | 1000 | 10010 |
| 9 | 1001 | 10011 |
| A | 1010 | 10110 |
| B | 1011 | 10111 |
| C | 1100 | 11010 |
| D | 1101 | 11011 |
| E | 1110 | 11100 |
| F | 1111 | 11101 |

4B5B ENC

FIG. 7B

4B5B DECODE TABLE

| 5B | 4B | Hex |
|---|---|---|
| 11110 | 0000 | 0 |
| 01001 | 0001 | 1 |
| 10100 | 0010 | 2 |
| 10101 | 0011 | 3 |
| 01010 | 0100 | 4 |
| 01011 | 0101 | 5 |
| 01110 | 0110 | 6 |
| 01111 | 0111 | 7 |
| 10010 | 1000 | 8 |
| 10011 | 1001 | 9 |
| 10110 | 1010 | A |
| 10111 | 1011 | B |
| 11010 | 1100 | C |
| 11011 | 1101 | D |
| 11100 | 1110 | E |
| 11101 | 1111 | F |

4B5B DEC

FIG. 8B

| 4B5B DECODE TABLE | | |
|---|---|---|
| 5B | 4B | Hex |
| 00111 | 1111 | F |
| 01110 | 1110 | E |
| 10111 | 1101 | D |
| 11011 | 1100 | C |
| 10011 | 1011 | B |
| 11001 | 1010 | A |
| 00101 | 1001 | 9 |
| 01011 | 1000 | 8 |
| 10100 | 0111 | 7 |
| 11010 | 0110 | 6 |
| 01001 | 0101 | 5 |
| 01101 | 0100 | 4 |
| 10010 | 0011 | 3 |
| 10110 | 0010 | 2 |
| 01010 | 0001 | 1 |
| 10101 | 0000 | 0 |

4B5B DEC

FIG. 8A

| 4B5B ENCODE TABLE | | |
|---|---|---|
| Hex | 4B | 5B |
| F | 1111 | 00111 |
| E | 1110 | 01110 |
| D | 1101 | 10111 |
| C | 1100 | 11011 |
| B | 1011 | 10011 |
| A | 1010 | 11001 |
| 9 | 1001 | 00101 |
| 8 | 1000 | 01011 |
| 7 | 0111 | 10100 |
| 6 | 0110 | 11010 |
| 5 | 0101 | 01001 |
| 4 | 0100 | 01101 |
| 3 | 0011 | 10010 |
| 2 | 0010 | 10110 |
| 1 | 0001 | 01010 |
| 0 | 0000 | 10101 |

4B5B ENC

DATA TRANSMISSION SYSTEM INCLUDING ENCODER AND A CLOCK RECOVERY SYSTEM FOR DISPLAY DEVICE, DATA TRANSMISSION METHOD FOR DISPLAY DEVICE AND DISPLAY DEVICE

CROSS-REFERENCE TO RELATED APPLICATIONS

The present application is a Continuation application of U.S. patent application Ser. No. 14/726,904, filed on Jun. 1, 2015, which is a Continuation Application of U.S. patent application Ser. No. 13/431,859, filed on Mar. 27, 2012, now U.S. Pat. No. 9,049,092 B2, issued on Jun. 2, 2015, which is based on Japanese Patent Application No. 2011-073122 filed on Mar. 29, 2011, the entire contents of which are hereby incorporated by reference.

BACKGROUND

The present invention relates to a data transmission system for a display device, a data transmission method for a display device, and a display device, particularly relates to a data transmission system for a display device, a data transmission method for a display device, and a display device which adopt a clock-embedded serial data transmission system.

Generally, in a clock-embedded serial data transmission system, a clock data recovery circuit on a receiving side extracts a clock component from a received data, and recovers a clock. The recovered clock is referred to as a recovery clock. According to such a clock recovery system, when signals having the same level are consecutively received, the clock data recovery circuit cannot accurately recover the clock component. Therefore, there is adopted an encoding system such that signals having the same level are not made to be consecutive.

As an encoding system in which signals having the same level are not made to be consecutive, there is known an mBnB encoding system. According thereto, signals having the same level are not made to be consecutive by encoding a signal of m (m is a natural number) bits into a signal of n (n is a natural number and n>m) bits on the basis of a certain translation table to be transmitted thereafter. There is widely adopted a 4B5B encoding system, an 8B10B encoding system or the like. As an example thereof, there is adopted the 4B5B encoding system also in IEEE802.3u which is a standard of Ethernet (registered trademark).

Japanese Unexamined Patent Publication No. Sho59 (1974)-200561 discloses a technology where there are assigned 5 bits of bit patterns in which a number of 1 is 2 or 3 pieces, and consecutive numbers of the same code from the highest bit and the lowest bit are equal to or less than 2 to 4 bits of 16 kinds of bit patterns in a translation table of 4B5B encoding. Thereby, signals having the same level are restrained from being consecutive, and a mark rate (a rate of 0 to 1) is improved. Japanese Unexamined Patent Publication No. Heil(1989)-109826 discloses a technology of stabilizing a mark rate by preparing 2 sets of translation tables of mBnB encoding, and transmitting signals while switching the transmission tables at a constant period. Japanese Unexamined Patent Publication No. 2001-069181 discloses a technology of further restraining signals having the same level from being consecutive by transmitting the signals by subjecting the signals to no return inverse NRZx translation in an mBnB coding in mBnB encoding.

SUMMARY

The inventors found the following problem. As described later in details, in a data transmission system for a display device, an analog gray scale voltage is generated from a digital image data which is transmitted from a timing controller to a display driver (for example, source driver), and is outputted to each pixel of a display element. Here, the larger the amplitude of the gray scale voltage outputted, the larger the noise which is generated in accordance with the output. Therefore, there is also a high concern of generating a frequency difference or a phase difference between the received data and a recovery clock. In a case where the frequency difference or the phase difference is generated, the more frequent the changes of the signals received (the less consecutive the signals having the same level), at the higher speed, the correction of the frequency difference or the phase difference by the clock data recovery circuit is finished.

In the translation tables of Japanese Unexamined Patent Publication No. Sho59(1974)-200561, Japanese Unexamined Patent Publication No. Heil(19891-109826, and Japanese Unexamined Patent Publication No. 2001-069181, signals having the same level are restrained from being consecutive and a mark rate is improved as a total of translation tables. Further, these are not created for a display device. Therefore, a consideration is not given to an influence of noise in accordance with outputting the gray scale voltage mentioned above. That is, according to the data transmission methods disclosed in Japanese Unexamined Patent Publication No. Sho59(1974)-200561, Japanese Unexamined Patent Publication No. Heil (1989)-109826, and Japanese Unexamined Patent Publication No. 2001-069181, in a case where the frequency difference or the phase difference is generated between the received data and the recovery clock by the noise mentioned above, the frequency difference or the phase difference cannot be corrected at a high speed. There is a concern of being inferior in a stability of data transmission.

According to one aspect of the present invention, there is provided a data transmission system for a display device, the data transmission system having an encoder having at least one translation table, and encoding m (m is a natural number) bits of a data to n (n is a natural number and n>m) bits of a data on the basis of the translation table, a clock recovery circuit of recovering a clock from the data encoded by the encoder, a decoder of decoding the n bits of the encoded data to the m bits of the data in accordance with the clock recovered by the clock recovery circuit, and an output driver of outputting a gray scale voltage in accordance with the data decoded by the decoder, in which in the translation table, the larger the amplitude of the gray scale voltage of a bit pattern in $2^m$ pieces of bit patterns of the m bits of the data, the larger the data change index of the bit pattern which is assigned to the bit pattern in $2^m$ pieces of bit patterns in $2^n$ pieces of bit patterns of the n bits of the data.

According to another aspect of the present invention, there is provided a method of transmitting a data for a display device having the steps of encoding m (m is a natural number) bits of a data to n (n is a natural number and n>m) bits of a data on the basis of the translation table, recovering a clock from the encoded data, decoding the n bits of the encoded data to the m bits of the data in accordance with the recovered clock, and outputting a gray scale voltage in accordance with the decoded data, in which the larger the amplitude of the gray scale voltage of a bit pattern in $2^m$ pieces of bit patterns of the m bits of the data, the larger the data change index of the bit pattern which is assigned to the bit pattern in the $2^m$ pieces of bit patterns in $2^n$ pieces of bit patterns of the n bits of the data in the translation table.

According to still another aspect of the present invention, there is provided a display device having an encoder having at least one translation table, and encoding m (m is a natural number) bits of a data to n (n is a natural number and n>m) bits of a data on the basis of the translation table, a clock recovery circuit of recovering a clock from the data encoded by the encoder, a decoder of decoding the n bits of the encoded data to the m bits of the data in accordance with the clock recovered by the clock recovery circuit, an output driver of outputting a gray scale voltage in accordance with the data decoded by the decoder, and a display element having multiple pixels applied with the gray scale voltage, in which in the translation table, the larger the amplitude of the gray scale voltage of a bit pattern in $2^m$ pieces of bit patterns of the m bits of the data, the larger the data change index of the bit pattern which is assigned to the bit pattern in the $2^m$ pieces of bit patterns in $2^n$ piece of bit patterns of the n bits of the data.

According to the aspects of the present invention, in the translation table, the larger the amplitude of the gray scale voltage of a bit pattern in $2^m$ pieces of bit patterns of the m bits of the data, the larger the data change index of the bit pattern which is assigned to the bit pattern in the $2^m$ pieces of bit patterns in $2^n$ pieces of bit patterns of the n bits of the data. Therefore, the present invention is excellent in a stability of data transmission.

According to the aspects of the present invention, there can be provided a data transmission system for a display device and a data transmission method for a display device excellent in the stability of the data transmission.

BRIEF DESCRIPTION OF THE DRAWINGS

FIG. 3A is a timing chart for explaining an influence of a noise by an amplitude of an output of a display driver (in a case where an amplitude is large in a normally black mode);

FIG. 3B is a timing chart for explaining an influence of a noise by an amplitude of an output of a display driver (in a case where an amplitude is small in a normally black mode);

FIG. 4A is a timing chart for explaining an influence of a noise by an amplitude of an output of a display driver (in a case where an amplitude is large in a normally white mode);

FIG. 5A is a diagram showing a 4B5B encoder table according to the first embodiment;

FIG. 5B is a diagram showing a 4B5B decoder table according to the first embodiment;

FIG. 7A is a diagram showing a 4B5B encoder table which is defined in IEEE802.3u according to a comparative example of the first embodiment;

FIG. 7B is a diagram showing a 4B5B decoder table which is defined in IEEE802.3u according to the comparative example of the first embodiment;

FIG. 8A is a diagram showing a 4B5B encoder table according to a second embodiment;

FIG. 8B is a diagram showing a 4B5B decoder table according to the second embodiment;

DETAILED DESCRIPTION

A detailed description will be given of a specific embodiment to which the present invention is applied in reference to the drawings as follows. However, the present invention is not limited to the embodiment as follows. Further, the description and the drawings as follows are pertinently simplified in order to make the description clear.

First Embodiment

Figure 1:
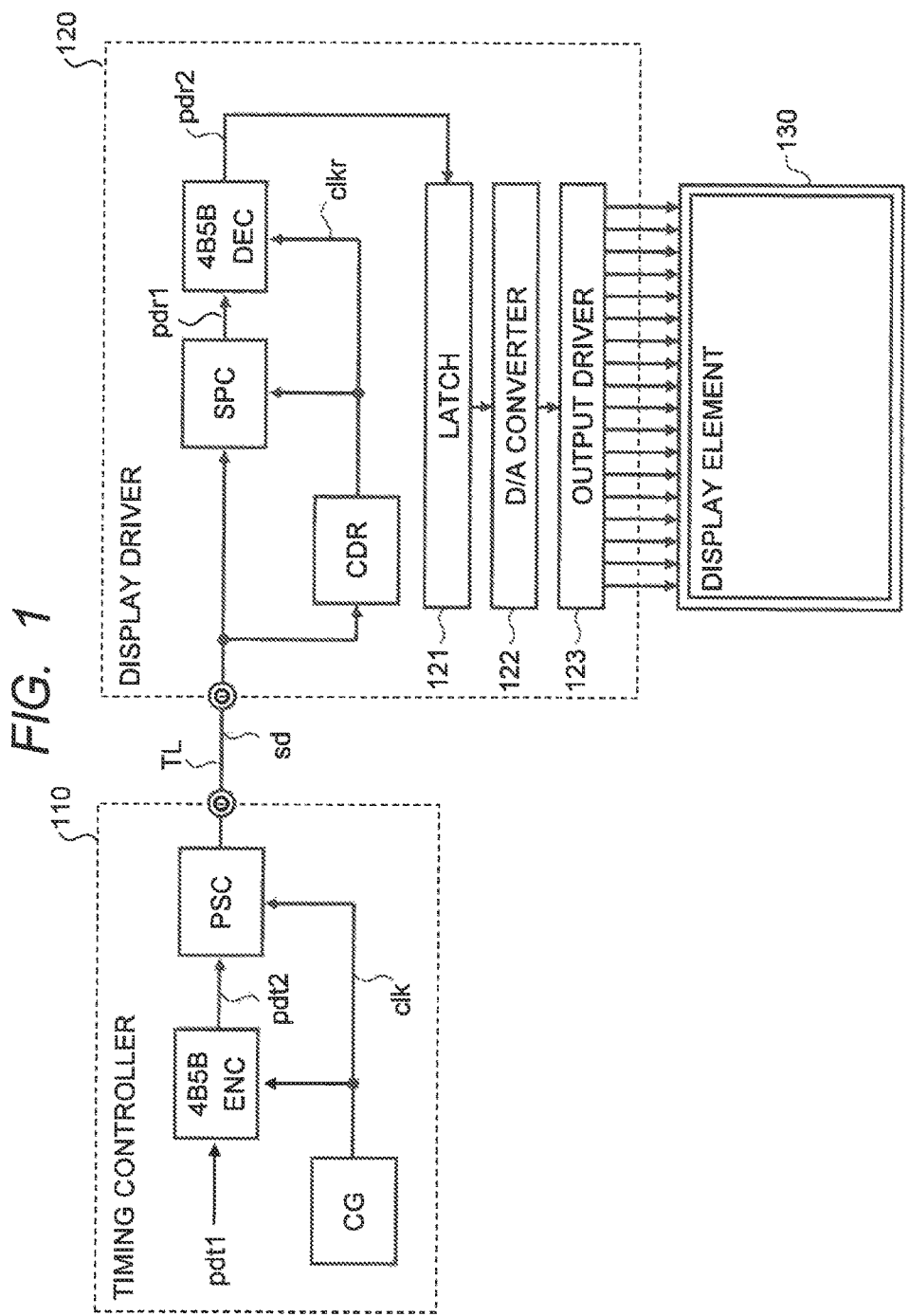
FIG. 1 is a block diagram of a data transmission system for a display device according to a first embodiment.

A description will be given of a data transmission system for a display device according to a first embodiment of the present invention in reference to FIG. 1. FIG. 1 is a block diagram of a data transmission system for a display device according to the first embodiment. As shown by FIG. 1, the data transmission system for a display device includes a Timing Controller 110 on a data transmitting side, a Display Driver 120 on a data receiving side, and a Display Element 130 at a data outputting destination. In the present embodiment, the Timing Controller 110 and the Display Driver 120 on the data receiving side are respectively configured by separate IC chips surrounded by dotted lines in FIG. 1.

Here, the Timing Controller 110 includes a Clock Generating Circuit CG, a 4B5B Encoder ENC, and a Parallel/Serial Converter PSC. Further, the Display Driver 120 includes a Clock Data Recovery Circuit CDR, a Serial/Parallel Converter SPC, a 4B5B Decoder DEC, a Latch Circuit 121, a Digital/Analog Converter (DAC) 122, and an Output Driver 123.

The Clock Generating Circuit CG generates a clock clk and supplies the generated clock clk to the 4B5B Encoder ENC and the Parallel/Serial Converter PSC.

The 4B5B Encoder ENC is operated in accordance with the clock clk supplied from the Clock Generating Circuit CG. Further, the 4B5B Encoder ENC includes a 4B5B translation table, and encodes a parallel transmission data pdt1 which is an input image data to a parallel transmission data pdt2 by using the 4B5B translation table.

Also the Parallel/Serial Converter PSC is operated in accordance with the clock clk supplied from the Clock Generating Circuit CG, and converts the parallel transmission data pdt2 into a serial data ad. The serial data ad is outputted from the Timing Controller 110, and is inputted to the Display Driver 120 via a Transmission Line TL.

The Clock Data Recovery Circuit CDR recovers a recovery clock clkr from the received serial data ad, and supplies the recovery clock clkr to the Serial/Parallel Converter SPC and the 4B5B Decoder DEC. Details of the Clock Data Recovery Circuit CDR will be described later.

The Serial/Parallel Converter SPC is operated in accordance with the recovery clock clkr supplied from the Clock Data Recovery Circuit CDR, and converts the serial data ad into a parallel receiving data pdr1.

Also the 4B5B Decoder DEC is operated in accordance with the recovery clock clkr supplied from the Clock Data Recovery circuit CDR. Further, the 4B5B Decoder DEC includes a 4B5B translation table for decoding the data encoded by the Encoder ENC. Further, the 4B5B Decoder DEC decodes the inputted parallel receiving data pdr1 into a parallel receiving data pdr2 by using the 4B5B translation table.

The latch circuit 121 temporarily holds the decoded parallel receiving data pdr2, and outputs the parallel receiving data pdr2 to DAC 122 at a predetermined timing. DAC 122 converts the parallel receiving data pdr2 which is a digital signal into an analog voltage signal.

The output driver 123 is configured by plural amplifiers respectively in correspondence with plural source lines of TFT's (Thin Film Transistor) which are arranged in the Display Element 130 in a matrix (not illustrated). Further, each amplifier of the output driver 123 generates a gray scale voltage by amplifying the analog voltage signal mentioned above, and outputs the gray scale voltage to the source line of the Display Element 130.

The Display Element 130 is, for example, a liquid crystal display element. Although not illustrated in FIG. 1, as is well known, the Display Element 130 is configured by a large number of pixels arranged in a matrix. Each element includes a TFT (Thin Film Transistor) as a switching element. TFT's are provided at plural source lines extended in an up and down direction of FIG. 1, plural gate lines extended in a left and right direction of FIG. 1, and respective intersecting portions of the source lines and the gate lines.

Figure 2:
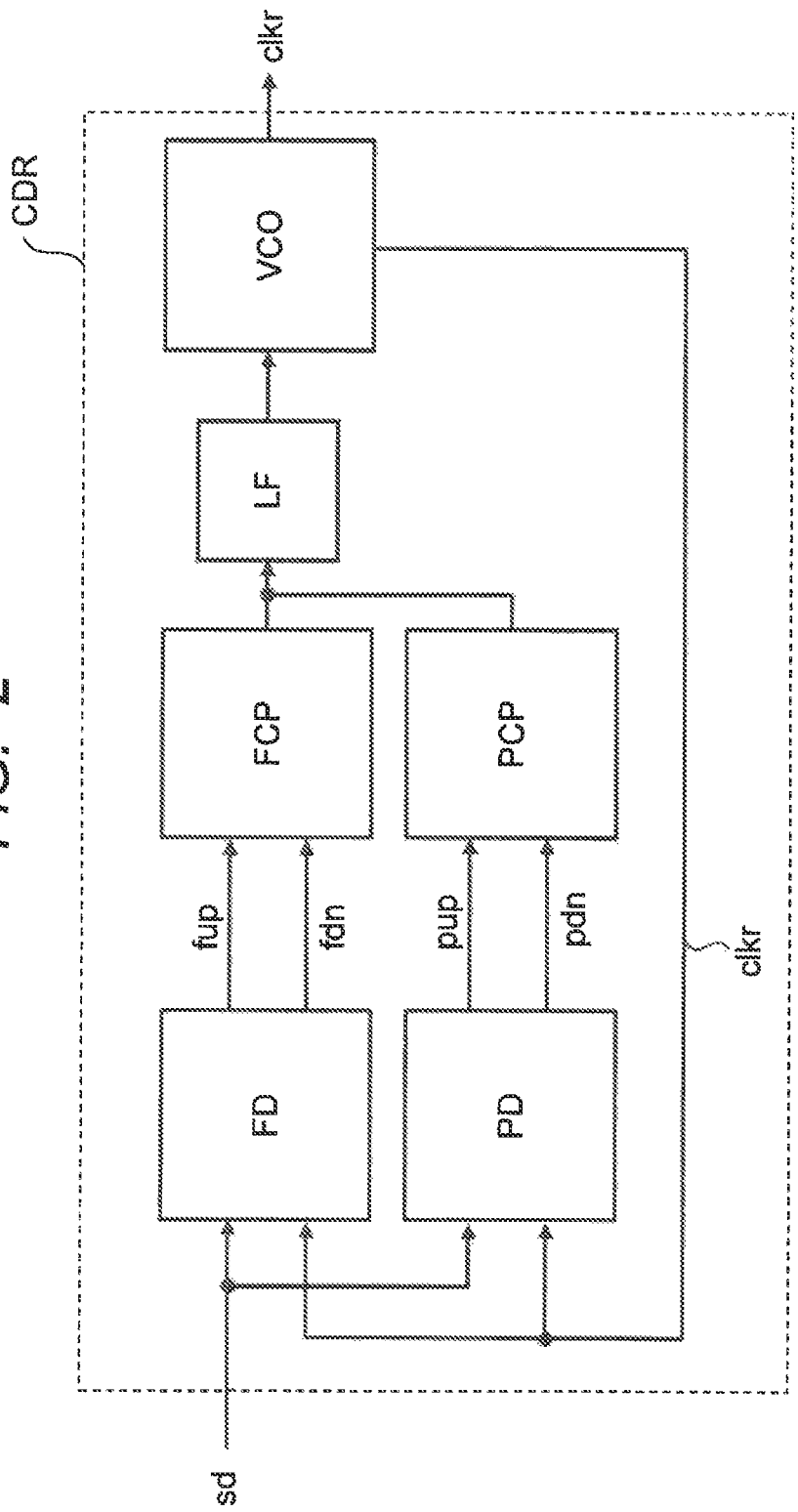
FIG. 2 is a block diagram of a CDR circuit according to the first embodiment.

Here, a description will be given of the Clock Data Recovery Circuit CDR in reference to FIG. 2. FIG. 2 is a block diagram of the Clock Data Recovery Circuit CDR according to the first embodiment. As shown by FIG. 2, the CDR circuit according to the first embodiment is a PLL (Phase Locked Loop) Circuit, and includes a Frequency Detector FD, a Phase Detector PD, a Frequency Control Charge Pump FCP, a Phase Control Charge Pump PCP, a Loop Filter LF, and a Voltage Controlled Oscillator VCO.

The Frequency Detector Circuit FD detects a difference of frequencies of the serial data ad transmitted from the Timing Controller and the recovery clock clkr. That is, the Frequency Detector FD extracts clock frequency information from the received serial data ad. The Frequency Detector FD executes a coarse control of the frequency of the recovery clock clkr.

When the frequency of the recovery clock clkr is lower than the frequency of the received serial data ad, the Frequency Detector FD generates a signal fup for increasing the frequency of the recovery clock clkr, and outputs the signal fup to the Frequency Control Charge Pump FCP. When the frequency of the recovery clock clkr is higher than the frequency of the received serial data ad, the Frequency Detector FD generates a signal fdn for reducing the frequency of the recovery clock clkr, and outputs the signal fdn to the Frequency Control Charge Pump FCP.

The Phase Detector PD detects a difference of phases of the serial data sd transmitted from the Timing Controller and the recovery clock clkr. That is, the Phase Detector PD extracts clock phase information from the received serial data sd. The Phase Detector PD executes a fine control of the frequency of the recovery clock clkr.

When the phase of the recovery clock clkr is more retarded than the phase of the received serial data ad, the Phase Detector PD generates a signal pup for advancing the phase of the recovery clock clkr, and outputs the recovery clock clkr to the Phase Control Charge Pump PCP. When the phase of the recovery clock clkr is more advanced than the phase of the received serial data sd, the Phase Detector PD generates a signal pdn for retarding the phase of the recovery clock clkr, and outputs the signal pdn to the Phase Control Charge Pump PCP.

The Frequency Control Charge Pump FCP generates an analog current signal from the inputted signal fup or the inputted signal fdn, and outputs the analog current signal to the Loop Filter LF. Similarly, the Phase Control Charge Pump PCP generates an analog current signal from the inputted signal pup or the inputted signal pdn and outputs the analog current signal to the Loop Filter LF. The Loop Filter LF generates a control voltage signal on the basis of the analog current signals inputted from the Frequency Control Charge Pump FCP and the Phase Control Charge Pump PCP.

Further, the Voltage Controlled Oscillator VCO generates the recovery clock clkr of a frequency in accordance with the control voltage signal inputted from the Loop Filter LF. The recovery clock clkr is outputted to the Serial/Parallel Converter SPC and the 4B5B Decoder DEC of FIG. 1, and is fed back to the Frequency Detector PD and the Phase Detector PD.

Here, the Frequency Detector FD extracts frequency information by detecting a point of changing the received serial data sd, and comparing the received serial data ad with the recovery clock clkr. Similarly, the Phase Detector PD extracts phase information by detecting a point of changing the received serial data ad and comparing the received serial data ad with the recovery clock clkr. Therefore, the more consecutive the signals at the same level, the more unabled the extraction of the frequency information and the phase information. Therefore, there is adopted an encoding system in which signals at the same level are not consecutive.

Next, an explanation will be given of a principle of generating a noise in accordance with an output of a gray scale voltage from the Output Driver 123 in reference to FIGS. 3A and 3B, 4A and 4B. FIGS. 3A, 3B, 4A, and 4B are timing charts for explaining an influence of a noise by an amplitude of an output of a display driver. In any of the drawings, there are shown waveforms of a strobe signal STB, a polarity signal POL, a transmission data DATA, an output gray scale voltage OUT, and a noise NOISE successively from above. Further, signal levels (L, H) are alternately switched in accordance with timings of rises of the strobe signal STB indicated at an uppermost stage. At each time of switching the polarity signal POL, the transmission data DATA is outputted as the output gray scale voltage OUT. Here, as indicated by an arrow mark in the drawing, the transmission data DATA is outputted at a next output timing since the transmission data is latched by the latch circuit 121.

First, an explanation will be given of a case of a normally black mode in reference to FIGS. 3A and 3B. FIG. 3A shows a case in which an amplitude is large in the normally black mode. FIG. 3B shows a case in which the amplitude is small in the normally black mode. As shown by FIG. 3A, in a case of FFh (hexadecimal expression) in which a data value of an image data of 8 bits is the largest, the amplitude of the output gray scale voltage OUT is large, and also the noise NOISE is large. On the other hand, as shown by FIG. 33, in a case of 00h (hexadecimal expression) in which the data value of the image data of 8 bits is the smallest, the amplitude of the gray scale voltage OUT is small, and also the noise NOISE is small.

Figure 4B:
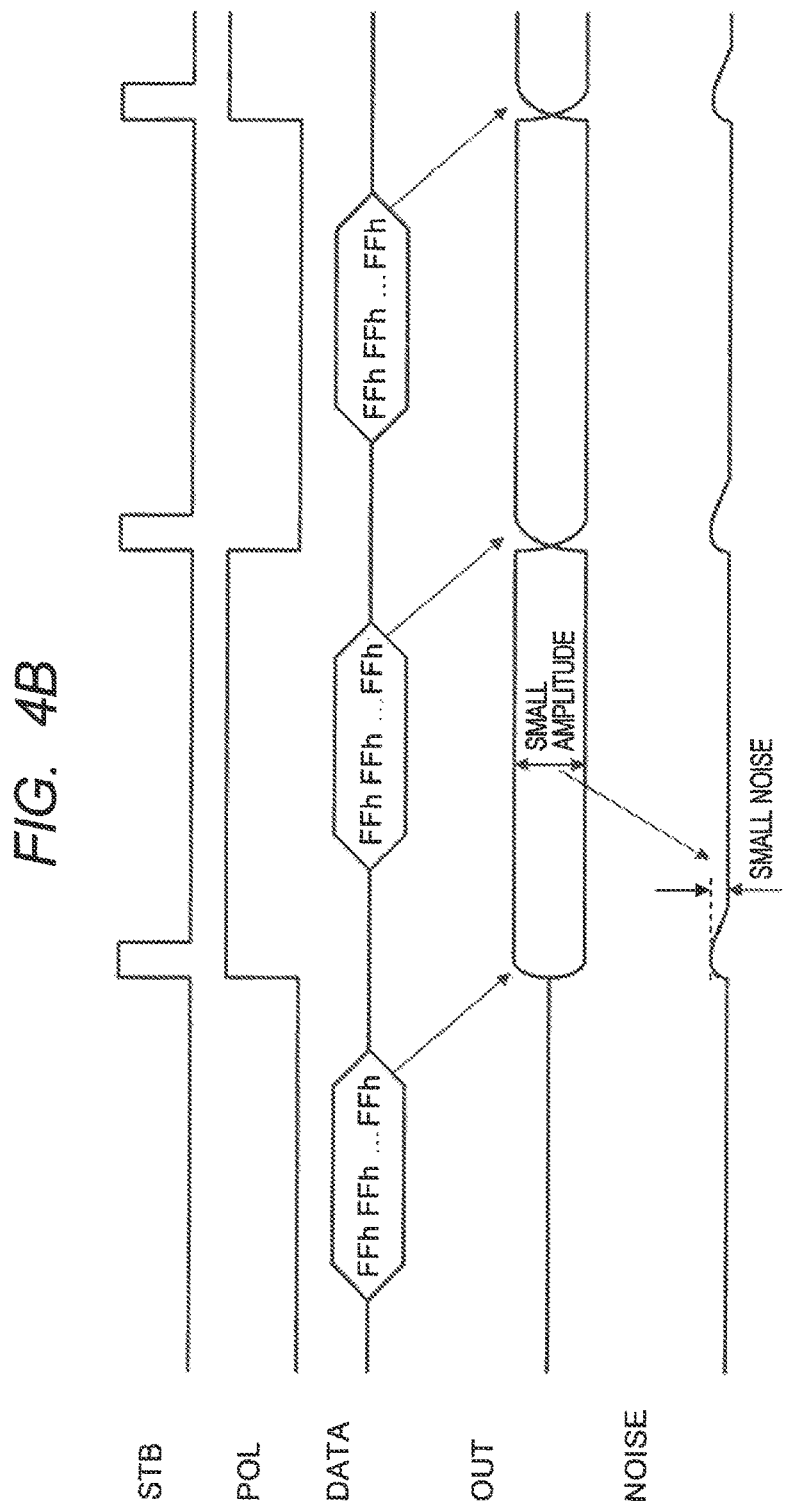
FIG. 4B is a timing chart for explaining an influence of a noise by an amplitude of an output of a display driver (in a case where an amplitude is small in a normally white mode)

Next, an explanation will be given of a case of a normally white mode in reference to FIGS. 4A and 4B. FIG. 4A shows a case in which an amplitude is large in a normally white mode. FIG. 4B shows a case in which the amplitude is small in the normally white mode. As shown by FIG. 4A, in a case of 00h (hexadecimal expression) in which a data value of an image data of 8 bits is the smallest, the amplitude of the gray scale voltage OUT becomes large, and also the noise NOISE is large. On the other hand, as shown by FIG. 4B, in a case of FFh (hexadecimal expression) in which the data value of the image data of 8 bits is the largest, the amplitude of the output gray scale voltage OUT is small, and also the noise NOISE is small.

In this way, in the case of the normally black mode, the larger the data value of the transmission data DATA, the larger the amplitude of the output gray scale voltage OUT, and the larger the noise NOISE in accordance with the output. On the other hand, in the case of the normally white mode, the smaller the data value of the transmission data DATA, the larger the amplitude of the output of gray scale voltage OUT, and the larger the noise NOISE in accordance with the output. Therefore, there are brought about the frequency difference and the phase difference between the received data and the recovery clock, and there is a concern that the data cannot correctly be received.

Next, an explanation will be given of a 4B5B translation table in reference to FIGS. 5A and 5B. The translation table is one of technical features of the present invention. FIG. 5A is a diagram showing a 4B5B encoder table according to the first embodiment. FIG. 5B is a diagram showing a 4B5B decoder table according to the first embodiment. FIGS. 5A and 5B show a case of a normally black mode.

As described above, in a case where a frequency difference or a phase difference is brought about by a noise NOISE in accordance with an output of a gray scale voltage, the more frequently the changes in the received serial data ad (the more inconsecutive the signals having the same level), at the high speed, a correction of the frequency difference or the phase difference is finished by the Clock Data Recovery Circuit CDR, which is advantageous. Hence, according to the present embodiment in a case of the normally black mode, there is assigned a bit pattern of 5B in which changes of the serial data ad is frequent successively from an output gray scale voltage OUT having a large amplitude, that is, from a transmission data DATA having a large data value. Thereby, a stable data transmission can be realized even in a case where the amplitude of the output gray scale voltage OUT is large, and the noise is liable to be generated.

Specifically, in an example of FIG. 5A, there is assigned 5 bits of a bit pattern 5B=10101 having a number of times of changes of 4 to 4 bits of a maximum value 4B=1111 (Hex=F) which is shown at the lowest line of the table. Therefore, the 4B5B Encoder ENC encodes an image data "FFh, FFh, . . . , FFh" to "1010110101, 1010110101, . . . , 1010110101".

There is assigned 5 bits of a bit pattern 5B=01010 having a number of times of changes of 4 to the second largest 4 bits value 4B=1110 (Hex=E) that is indicated at the second line from a bottom of the table. There is assigned 5 bits of a bit pattern 5B=10110 having a number of times of changes of 3 to the third largest 4 bits value 4B=1101 (Hex=D) indicated at the third line from the bottom of the table. In the following, as shown by FIG. 5A, there is assigned 5 bits of bit patterns to 4 bits of bit patterns. Further, a description will be given later of details of the method of creating the 4B5B translation table in reference to FIG. 6.

FIG. 5B is an inverse translation table (decode table) of the translation table (encode table) of FIG. 5A. That is, by the translation table of FIG. 5B, 5 bits of the bit patterns are respectively decoded to 4 bits of the original bit patterns. For example, the 4B5B decoder DEC decodes the encoded image data "1010110101, 1010110101, . . . , 1010110101" to "FFh, FFh, . . . , FFh".

Figure 6:
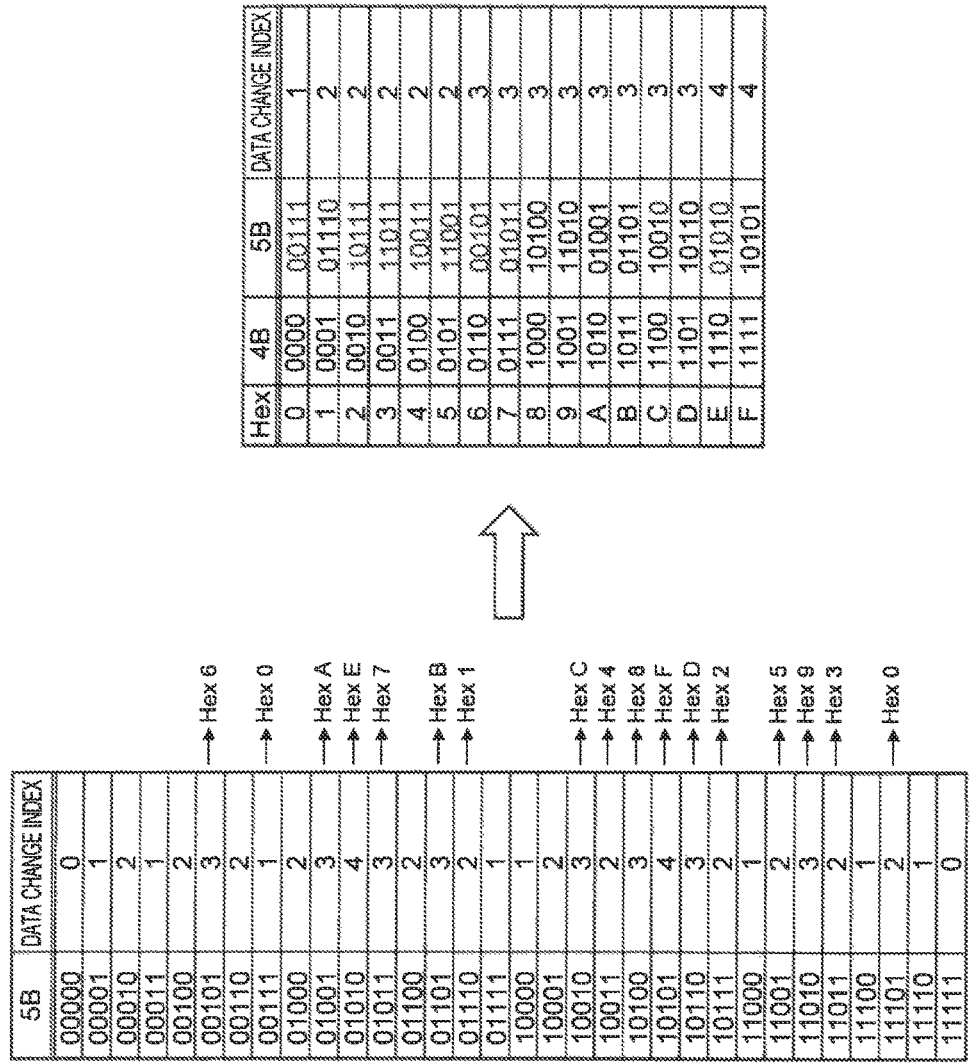
FIG. 6 is a diagram showing an example of assigning 4 bits 16 kinds or bit patterns to 5 bits 32 kinds of bit patterns in a 4B5B translation table.

Next, a detailed explanation will be given of a method of creating the 4B5B translation table in reference to FIG. 6. FIG. 6 is a diagram showing an example of assigning 4 bits 16 kinds of bit patterns to 5 bits 42 kinds of bit patterns in a 4B5B translation table.

Here, consider to define an mBnB translation table which assigns n (n is a natural number and n>m) bits of a bit pattern having a large number of changes of bits to m (m is a natural number) bits of an image data having a large data value by generalizing the 4B5B translation table. Hence, first, there is calculated a data change index which is a number of times of changes of 1 and 0 for $2^n$ ways of bit patterns of a translation object. The data change index is obtained by Equation (1) as follows when values of n bits of bit patterns (1 or 0) are designated by notations $b_{n-1}$, $b_{n-2}$, . . . , $b_0$ successively from MSB to LSB.

Equation 1

$$\text{Data change index} = \sum_{k=0}^{n-2} (b_{k+1} \oplus b_k) \quad (1)$$

$\oplus$: EXOR (exclusive Or) calculation

Next, a translation table is defined by carrying out an assignment from n bits of a bit pattern having a larger value of an obtained data change index, and successively from m bits of a data having a larger data value. However, in a case where values of data change indexes of n bits of bit patterns stay the same, there is no particular restriction on which data value of m bits of a data is assigned.

A specific explanation will be given of a procedure of defining a 4B5B translation table in reference to FIG. 6. First, data change indexes are calculated for 5 bits of bit patterns of $2^5$=32 ways. For example, when a data change index is calculated by using Equation (1) for a code of 10101, the data change index=4 as shown by Equation (2) as follows.

Equation 2

$$\begin{aligned}\text{Data change index of } 10101 &= (1 \oplus 0) + (0 \oplus 1) + (1 \oplus 0) + (0 \oplus 1) \\ &= 1+1+1+1 \\ &= 4\end{aligned} \quad (2)$$

Next, a translation table is defined by carrying out an assignment successively from 5 bits of a bit pattern having a larger calculated data change index, and from 4 bits of a data having a larger data value. There is assigned either of 5 bits of a bit pattern 5B=10101 or 5B=01010 which has a maximum data change index of 4 to either of 4 bits of a data 4B=1111 (Hex=F) having the largest data value or 4B=1110 (Hex=E) having the second largest data value. Here, in a case where values of data change indexes of n bits of bit patterns stay the same, there is no particular restriction on which data value of m bits of a data is assigned. Therefore, although in the translation table shown in FIG. 6, 5 bits of a bit pattern 5B=10101 is assigned to 4 bits of a data 4B=1111 (Hex=F) having the largest data value, 5 bits of a bit pattern 5B=01010 may be assigned thereto.

In the translation table (the same as that of FIG. 5A) shown on a right side of FIG. 6 which is obtained in this way, the larger the data value of 4 bits of data, the larger the data change index of 5 bits of the bit patterns assigned. Thereby, even in a case where the amplitude of the output gray scale voltage OUT is large, and a noise is liable to be generated, the stable data transmission can be realized.

Further, in a case of a normally black mode, it is necessary to assign 5 bits of a bit pattern having a larger data change index successively from a 4 bits data having a larger data value (a larger amplitude of the output gray scale voltage OUT). However, there may be 5 bits of a bit pattern which is not used in the midst of the assignment. For example, in FIG. 6, there is not assigned 5 bits of a bit pattern 5B=10001 which has a data change index of 2 to 4B=0000 (Hex=0), but there is assigned 5 bits of a bit pattern 5B=00111 having a data change index of 1. This is because 5 bits of a bit pattern 5B=10001 are used for other use.

Next, an explanation will be given of a 4B5B translation table which is defined in IEEE802.3u according to a comparative example of the first embodiment. FIG. 7A is a diagram showing a 4B5B encoder table which is defined in IEEE802.3u according to a comparative example of the first embodiment. FIG. 7B is a diagram showing a 4B5B decoder table which is defined in IEEE802.3u according to the comparative example of the first embodiment. Here, consider a case of a normally black mode.

In an example of FIG. 7A, there is assigned 5 bits of a bit pattern 5B=11101 having a number of times of changes (data change index) of 2 to 4 bits of the largest value 4B=1111 (Hex=F) which is shown at the lowest line of the table. Therefore, the 4B5B Encoder ENC encodes image data "FFh, FFh, . . . , FFh" to "1110111101, 1110111101, . . . , 1110111101".

There is assigned 5 bits of a bit pattern 5B=1110 having a number of times of changes (data change index) of 1 to 4 bits of the second largest value 4B=1110 (Hex=E) which is shown at the second line from the bottom of the table. There is assigned 5 bits of a bit pattern 5B=11011 having a number of times of changes (data change index) of 2 to 4 bits of the third largest value 4B=1101 (Hex=D) which is shown at the third line from the bottom of the table. In the following, as shown in FIG. 7A, 5 bits of bit patterns are assigned to 4 bits of bit patterns.

FIG. 7B is an inverse translation table (decode table) of the translation table (encode table) of FIG. 7A. That is, 5 bits of respective bit patterns are decoded to 4 bits of original bit patterns by the translation table of FIG. 7B.

In this way, in the comparative example, there is not assigned 5 bits of a bit pattern having a large data change index to a 4 bits data having a large data value (large amplitude of output gray scale voltage OUT). Therefore, in a case of a normally black mode, the comparative example is inferior to the present embodiment in the stability of data transmission.

Second Embodiment

Next, an explanation will be given of a 4B5B translation table according to a second embodiment of the present invention in reference to FIGS. 8A and 8B. FIG. 8A is a diagram showing a 4B5B encoder table according to the second embodiment. FIG. 8B is a diagram showing a 4B5B decoder table according to the second embodiment. FIGS. 8A and 8B show a case of a normally white mode. A configuration other than explained below is similar to that of the first embodiment, and therefore, an explanation thereof will be omitted.

As described above, in a case where a frequency difference or a phase difference is brought about by a noise NOISE in accordance an output of a gray scale voltage, the more frequent the change of the received serial data sd (the more inconsecutive the signals having the same level), at the higher speed the correction of the frequency difference or the phase difference is finished by the Clock Data Recovery Circuit CDR, which is advantageous. Hence, according to the present embodiment which is a case of a normally white mode, there is assigned bit patterns of 5B in which changes of the serial data ad are more frequent successively from transmission data DATA having the larger amplitude of the output gray scale voltage OUT, that is, the smaller data values. Thereby, the stable data transmission can be realized even in a case where the amplitude of the output gray scale voltage OUT is large, and a noise is liable to be generated.

Specifically, in an example of FIG. 8A, there is assigned 5 bits of a bit pattern 5B=10101 having a number of times of changes of 4 to 4 bits of the smallest value 4B=0000 (Hex=0) which is shown at the lowest line of the table. Therefore, the 4B5B Encoder ENC encodes image data "00h, 00h, . . . , 00h" to "1010110101, 1010110101, . . . , 1010110101".

There is assigned 5 bits of a bit pattern 5B=01010 having a number of times of changes 4 to 4 bits of the second smallest value 4B=0001 (Hex=1) which is shown at the second line from the bottom of the table. There is assigned 5 bits of a bit pattern 5B=10110 having a number of times of changes of 3 to 4 bits of the third smallest value 4B=0010 (Hex=2) which is shown at the third line from the bottom of the table. In the following, as shown in FIG. 8A, there are assigned 5 bits of bit patterns to 4 bits of bit patterns. In this way, in a case of a normally white mode, there are assigned 5 bits of bit patterns having larger data change indexes successively from 4 bits data having smaller data values (larger amplitudes of the output gray scale voltages OUT).

FIG. 8B is an inverse translation table (decode table) of the translation table (encode table) of FIG. 8A. That is, 5 bits of respective bit patterns are decoded to 4 bits of original bit patterns by the translation table of FIG. 8B. For example, the 4B5B Decoder DEC decodes encoded image data "1010110101, 1010110101, . . . , 1010110101" to "00h, 00h, . . . , 00h".

Next, consider a case of a normally white mode with regard to the 4B5B translation table which is defined by IBEE802.3u according to the comparative example of the first embodiment. In an example of FIG. 7A, there is assigned 5 bits of a bit pattern 5B=11111.0 having a number of changes of changes (data image index) of 1 to 4 bits of the smallest value 4B=0000 (Hex=0) which is shown at the topmost line of the table. Therefore, the 4B5B Encoder ENC encodes image data "00h, 00h, . . . , 00h" to "1111011110, 1111011110, . . . , 1111011110".

There is assigned 5 bits of a bit pattern 5B=01001 having a number of times of changes (data change index) of 3 to 4 bits of the second smallest value 4B=0001 (Hex=1) which is shown at the second line from the top of the table. There is assigned 5 bits of a bit pattern 5B=10100 having a number of times of changes (date change index) of 3 to 4 bits of the third smallest value 4B=0010 (Hex=2) which is shown at the third line from the top of the table. In the following, as shown by FIG. 7A, 5 bits of bit patterns are assigned to 4 bits of bit patterns.

In this way, in the comparative example, there is not assigned 5 bits of a bit pattern having a large data change index to a 4 bits data having a small data value (a large amplitude of the output gray scale voltage OUT). Therefore, also in a case of a normally white mode, the comparative example is inferior to the present embodiment in the stability of the transmission.

Third Embodiment

Figure 9:
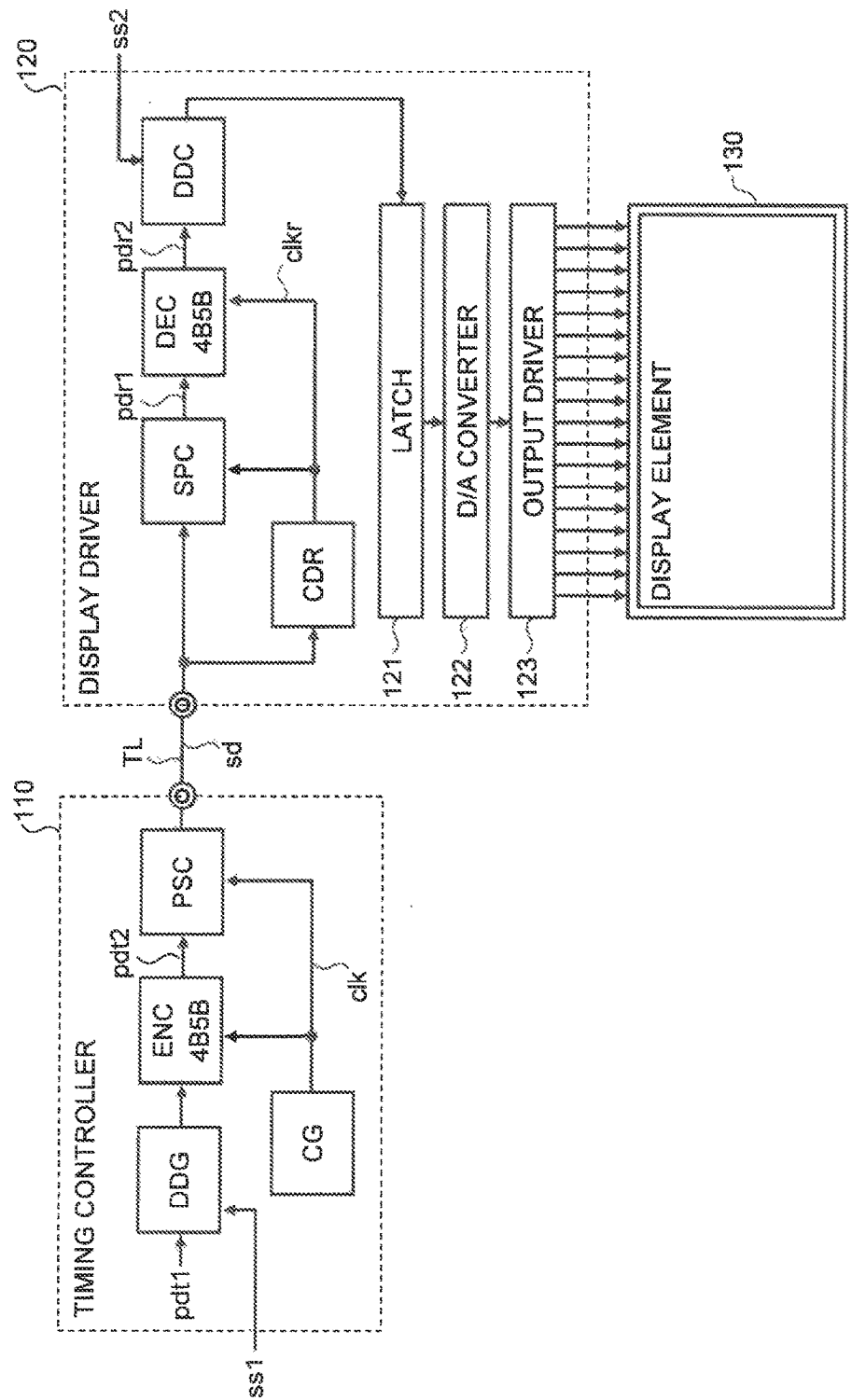
FIG. 9 is a block diagram of a data transmission system for a display device according to a third embodiment.

Next, an explanation will be given of a data transmission system for a display device according to a third embodiment of the present invention in reference to FIG. 9. FIG. 9 is a block diagram of a data transmission system for a display device according to the third embodiment. A difference of the third embodiment from the first embodiment resides in that the Timing Controller 110 includes a Display Data Generating Circuit DDG, and the Display Driver 120 includes a Display Data Converter. The other configuration is similar to that of the first embodiment, and therefore, an explanation thereof will be omitted.

The Display Data Generating Circuit DDG regularly converts or inversely converts the parallel transmission data pdt1 in accordance with a display selecting signal ss1 to output to the 4B5B encoder ENC. Further, the Display Data Converter DDC regularly converts or inversely converts the parallel receiving data pdr2 which has been decoded by the 4B5B Decoder DEC in accordance with a display selecting signal ss2 to output to the latch circuit 121. Here, the display selecting signals ss1 and ss2 are signals for selecting a display mode of a normally black mode or a normally white mode. The display selecting signal ss1 is inputted from outside of the Timing Controller 110, and the display selecting signal ss2 is inputted from outside of the Display Driver 120.

For example, in a case where the 4B5B Encoder ENC and the 4B5B Decoder DEC include the 4B5B translation tables for the normally black mode of FIGS. 5A and 5B, the parallel transmission data pdt1 and the parallel receiving data pdr2 are regularly converted in the normally black mode, and inversely inverted in the normally white mode.

Specifically, in the case of the normally black mode, an image data FFh=11111111 which is liable to generate a noise the most is regularly converted by the Display Data Generating Circuit DDG on a transmitting side, and is outputted as 11111111. The 11111111 is encoded to 1010110101 by the 4B5B Encoder ENC. On a receiving side, 1010110101 is decoded to 11111111 by the 4B5b Decoder DEC. Further, 11111111 is regularly converted by the display Data Converter DDC and is outputted as 11111111=FFh.

On the other hand, in a case of the normally white mode, an image data 00h=00000000 which is liable to generate a noise the most is inversely converted by the Display Data Generating Circuit DDG on a transmitting side, and is outputted as 11111111. The 11111111 is encoded to 1010110101 by the 4B5B Encoder ENC. On a receiving side, 1010110101 is decoded to 11111111 by the 4B5B Decoder DEC. Further, 11111111 is inversely converted by the Display Data Converter DDC and is outputted as 00000000=00h.

Contrary to the above-described, in a case where the 4B5B encoder ENC and the 4B5B Decoder DEC have the 4B5B translation tables for the normally white mode of FIGS. 8A and 8B, the parallel transmission data pdt1 and the parallel receiving data pdr2 are inversely converted in the normally black mode and regularly converted in the normally white mode.

Specifically, in the case of the normally black mode, the image data FFh=11111111 which is liable to generate a noise the most is inversely converted by the Display Data Generating Circuit DDG on a transmitting side, and is outputted as 00000000. The 00000000 is encoded to 1010110101 by the 4B5B Encoder ENC. On the receiving side, 1010110101 is decoded to 00000000 by the 4B5B Decoder DEC. Further, 00000000 is inversely converted by the Display Data Converter DDC and is outputted as 11111111=FFh.

On the other hand, in the case of the normally white mode, an image data 00h=00000000 which is liable to generate a noise the most is regularly converted by the Display Data Generating Circuit DDG on a transmitting side, and is outputted as 00000000. The 00000000 is encoded to 1010110101 by the 4B5B Encoder ENC. On the receiving side, 1010110101 is decoded to 00000000 by the 4B5B Decoder DEC. Further, 00000000 is regularly converted by the Display Data Converter DDC and is outputted as 00000000=00h.

Both of the normally black mode and the normally white mode can be dealt with even by including only one kind of translation tables for the normally black mode or the normally white mode. The stable data transmission can be realized regardless of the display modes.

Fourth Embodiment

Figure 10:
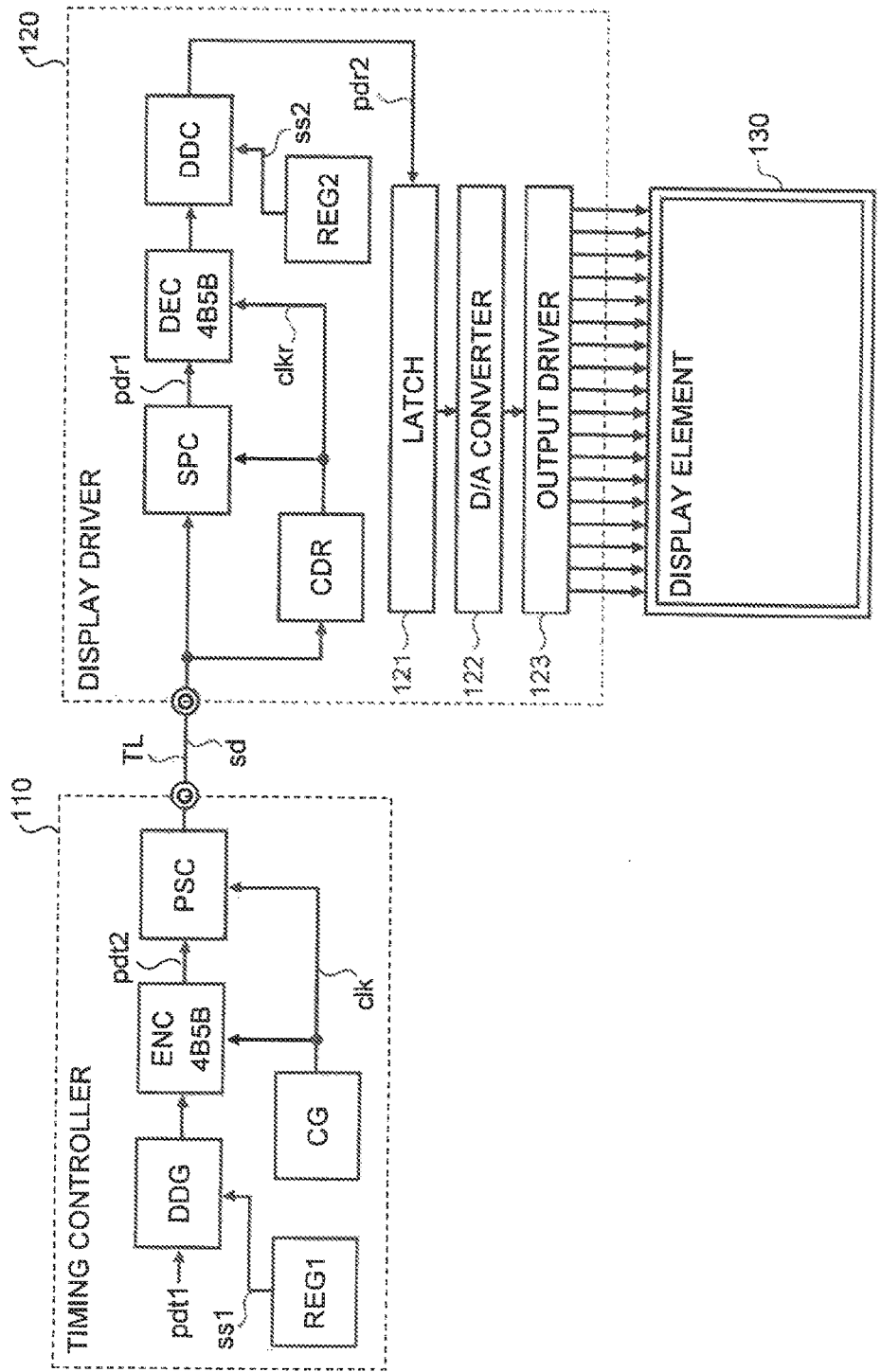
FIG. 10 is a block diagram of a data transmission system for a display device according to a fourth embodiment.

Next, an explanation will be given of a data transmission system for a display device according to a fourth embodiment of the present invention. FIG. 10 is a block diagram of a display device according to the fourth embodiment. According to the third embodiment, the display selecting signal ss1 is inputted from outside of the timing controller 110 and the display selecting signal ss2 is inputted from outside of the display driver 120. In contrast thereto, according to the fourth embodiment, the Timing Controller 110 includes a register REG1 which stores the display selecting signal ss1, and the Display Driver 120 includes a register REG2 which stores the display selecting signal ss2. The other configuration is similar to that of the third embodiment, and therefore, an explanation thereof will be omitted. Thereby, an effect similar to that of the third embodiment can be achieved.

Although the explanation has been given of the present invention in reference to the embodiments as described above, the present invention is not limited by the above-described. The configuration or the details of the present invention can variously be modified so as to be able to be understood by the person skilled in the art within in the scope of the present invention. Further, as described above, the present invention is applicable to the mBnB encoding system (m, n are natural numbers and m<n), and the present invention is particularly preferable for the 4B5B encoding system and the 8B10B encoding system.

The invention claimed is:

1. A data transmission system for a display device, the data transmission system comprising:
    an encoder including at least one translation table, and encoding m (m is a natural number) bits of a data into n (n is a natural number and n>m) bits of a data on a basis of the translation table;
    a parallel-to-serial converter for subjecting the encoded data outputted from the encoder to a parallel-to-serial conversion;
    a clock recovery circuit for recovering a clock from the data encoded by the encoder and serialized by the parallel-to-serial converter;
    a serial-to-parallel converter for subjecting the data outputted from the parallel-to-serial converter to a serial-to-parallel conversion;
    a decoder for decoding the n bits of the encoded data to the m bits of the data in accordance with the clock recovered by the clock recovery circuit; and
    an output driver for outputting a gray scale voltage in accordance with the data decoded by the decoder, wherein an amplitude of the gray scale voltage is determined according to a value of the m bit of the data, and
wherein, in the translation table, a larger the amplitude of the gray scale voltage of a bit pattern in $2^m$ pieces of bit patterns of the m bits of the data, a larger a data change index of the bit pattern which is assigned to the bit pattern in the $2^m$ pieces of bit patterns in $2^n$ pieces of bit patterns of the n bits of the data.

2. The data transmission system for a display device according to claim 1, wherein, in the at least one translation table, the encoder includes a first translation table for a normally black mode as the translation table, a larger a data value of the bit pattern in $2^m$ pieces of the bit patterns of the m bits of the data, a larger the data change index of the bit pattern which is assigned to the bit pattern in the $2^m$ pieces of bit patterns in the $2^n$ pieces of the bit patterns of the n bits of the data.

3. The data transmission system for a display device according to claim 1, wherein the encoder includes a second translation table for a normally white mode as the translation table, and in the second translation table, a smaller a data value of the bit pattern in the $2^m$ pieces of the bit patterns of the m bits of the data, a larger the data change index of the bit pattern which is assigned to the bit pattern in the $2^m$ pieces of bit patterns in the $2^n$ pieces of the bit patterns of the n bits of the data.

4. The data transmission system for a display device according to claim 1, further comprising:
a data generating circuit for regularly converting or inversely converting the data inputted to the encoder in accordance with a first display mode signal; and
a data converter for regularly converting or inversely converting the data outputted from the decoder in accordance with a second display mode,
wherein the translation table is only one translation table for a normally black mode or for a normally white mode.

5. The data transmission system for a display device according to claim 4, further comprising:
a first register for storing the first display mode signal; and
a second register for storing the second display mode signal.

6. The data transmission system for a display device according to claim 4, wherein the first and the second display modes comprise signals indicating the normally black mode or the normally white mode.

* * * * *